(12) United States Patent
Sobek

(10) Patent No.: US 7,912,784 B2
(45) Date of Patent: Mar. 22, 2011

(54) METHODS AND SYSTEMS FOR PROCESSING, ACCOUNTING, AND ADMINISTRATION OF STORED VALUE CARDS

(75) Inventor: Michael F. Sobek, Leawood, KS (US)

(73) Assignee: Store Financial Services, LLC, Overland Park, KS (US)

( * ) Notice: Subject to any disclaimer, the term of this patent is extended or adjusted under 35 U.S.C. 154(b) by 0 days.

(21) Appl. No.: 12/852,994

(22) Filed: Aug. 9, 2010

(65) Prior Publication Data

US 2011/0029396 A1 Feb. 3, 2011

Related U.S. Application Data

(63) Continuation of application No. 10/927,684, filed on Aug. 27, 2004, now Pat. No. 7,797,233, which is a continuation-in-part of application No. 10/354,776, filed on Jan. 30, 2003.

(60) Provisional application No. 60/352,960, filed on Jan. 30, 2002.

(51) Int. Cl.
*G06Q 40/00* (2006.01)
(52) U.S. Cl. ............ 705/39; 370/389; 713/189; 705/35
(58) Field of Classification Search .................. 705/37, 705/7, 51; 380/231; 713/181
See application file for complete search history.

(56) References Cited

U.S. PATENT DOCUMENTS

| | | | | |
|---|---|---|---|---|
| 5,210,789 A | * | 5/1993 | Jeffus et al. | ............ 379/127.01 |
| 5,559,887 A | | 9/1996 | Davis et al. | |
| 5,596,642 A | | 1/1997 | Davis et al. | |
| 5,596,643 A | | 1/1997 | Davis et al. | |
| 5,754,655 A | * | 5/1998 | Hughes et al. | ............ 705/70 |
| 5,887,266 A | * | 3/1999 | Heinonen et al. | ............ 455/558 |
| 5,895,456 A | | 4/1999 | Beale et al. | |
| 5,899,980 A | * | 5/1999 | Wilf et al. | ............ 705/26 |
| 5,920,847 A | | 7/1999 | Kolling et al. | |
| 6,000,608 A | | 12/1999 | Dorf | |
| 6,045,050 A | | 4/2000 | Ippolito et al. | |
| 6,076,075 A | | 6/2000 | Teicher | |
| 6,115,458 A | | 9/2000 | Taskett | |
| 6,295,522 B1 | | 9/2001 | Boesch | |
| 6,302,326 B1 | | 10/2001 | Symonds et al. | |

(Continued)

OTHER PUBLICATIONS

David K. Gifford, Lawerence C. Stewart, Andrew C. Payne, G. Winfield Treese, Proceedings of the First USENIX Workship on Electronic Commerce. Payment Switches for Open Networks. Jul. 1995 (USENIX).*

(Continued)

*Primary Examiner* — Ella Colbert
*Assistant Examiner* — Chika Ojiaku
(74) *Attorney, Agent, or Firm* — Armstrong Teasdale LLP

(57) ABSTRACT

Methods are described for accounting, administration and processing of transactions utilizing a stored value card utilizing an EFT service gateway and providing balances for the cards across a plurality of point of sale devices. One method includes receiving a message generated by the point of sale system of a merchant and parsing the message into data elements. The method also includes routing the message through a switch controller to an account holder database based on an institution ID and a branch ID, accessing an account within the database utilizing the account key, and determining if an account holder's monetary balance in the account is greater than or equal to the transaction amount. A message is formatted and one of an authorization approval or a denial based upon the determination is transmitted within the message.

25 Claims, 17 Drawing Sheets

U.S. PATENT DOCUMENTS

| | | |
|---|---|---|
| 6,315,195 B1 | 11/2001 | Ramachandran |
| 6,473,500 B1 | 10/2002 | Risafi et al. |
| 7,337,144 B1 | 2/2008 | Blinn |
| 7,386,516 B2 | 6/2008 | Turgeon |
| 2001/0023402 A1 | 9/2001 | Flynn |
| 2001/0034720 A1 | 10/2001 | Armes |
| 2001/0054003 A1 | 12/2001 | Chien et al. |
| 2002/0082962 A1* | 6/2002 | Farris et al. .................... 705/35 |
| 2002/0091649 A1 | 7/2002 | Anvekar et al. |
| 2002/0097715 A1* | 7/2002 | Roerick ........................ 370/389 |
| 2002/0115449 A1 | 8/2002 | Allen |
| 2002/0174016 A1 | 11/2002 | Cuervo |
| 2002/0174030 A1 | 11/2002 | Praisner |
| 2002/0190123 A1 | 12/2002 | Anvekar et al. |

OTHER PUBLICATIONS

Demosthenes Papameletiou, Study on Electronic Payment Systems for the Committee on Economic and Monetary Affairs and Industrial Policy of the European Parliament, May 1999 (EPay).*

* cited by examiner

Example of a fully depleted card

TEST MERCHANT

THANK YOU COME AGAIN!
E454589600000000 AA1A

DATE          TIME 10:42AM

ITEM 020 SALE $100.00
ACCT:4768543987659008      786
AUTHORIZATION CODE: 1EMPTY

I AGREE TO PAY ABOVE TOTAL AMOUNT
ACCORDING TO CARD ISSUER AGREEMENT
(MERCHANT AGREEMENT IF CREDIT VOUCHER)

X_____
   SIGNATURE

TOP COPY-MERCHANT   BOTTOM COPY-CUSTOMER

220

This would represent a Gift Card with no remaining balance

EOD GIFT CARD ACCOUNT TRANSACTION DETAIL BY PROPERTY
09/12/2003

PROPERTY: TOWN CENTER PLAZA                     PRINT DATE: 09/13/2003
                                                PRINT TIME: 16:08:18

TOTAL SALES             $2,864.38    CARDS ACTIVATED      68
TOTAL CARD AMOUNT       $2,864.38    CARDS RE-ISSUED       0
TOTAL PROPERTY FEES         $0.00    CARDS LOCKED          0
                                     CARDS UNLOCKED        0
                                     CARDS TRANSFERRED     0
                                     CARDS VOIDED          0

| REFERENCE NBR | DESC | CARD NUMBER | CARD AMT | PROP FEES | TRAN AMT | PYMT TYPE | CSR | DATE | TIME |
|---|---|---|---|---|---|---|---|---|---|
| 00000000006283 | NEWCRD | 5001011528882998 | 50.00 | 0.00 | 50.00 | CASH | 123 | 09/12/03 | 08:05:44 |
| 00000000006284 | NKWCRD | 5001011528892982 | 20.00 | 0.00 | 20.00 | VISA | 120 | 09/12/03 | 09:53:56 |
| 00000000006285 | NEWCRD | 5001011529902857 | 20.00 | 0.00 | 20.00 | CHCK | 123 | 09/12/03 | 09:12:11 |
| 00000000006286 | NEWCRD | 5001011529916850 | 25.00 | 0.00 | 25.00 | CASH | 123 | 09/12/03 | 09:26:09 |

Report: Daily Merchant Redemption Detail by Property - Microsoft Internet Explorer

DAILY MERCHANT REDEMPTION DETAIL BY PROPERTY
09/12/2003

PROPERTY: TOWN CENTER PLAZA

PRINT DATE: 09/13/2003
PRINT TIME: 16:20:44

TOTAL REDEMPTIONS: $2,885.99                    TOTAL TRANS: 71

| TRANSACTION TYPE | LOCATION | AMT | SIC CODE PRPTY CAT. | CARD NO. | TIME |
|---|---|---|---|---|---|
| MERCHANT CHANGE | GALYAN'S | 32.23 | 0 | 500101123479682 | 10:19:13 |
| MERCHANT CHANGE | THE WHITE HOUSE/ BLACK MARKET | 100.00 | 0 | 500101141398509 | 11:22:48 |
| MERCHANT CHANGE | CHICO'S | 65.00 | 0 | 500101144343503 | 11:22:50 |
| MERCHANT CHANGE | KANSAS SAMPLER | 30.00 | 0 | 500101127801136 | 11:30:01 |
| MERCHANT CHANGE | POTTERY BARN | 69.89 | 0 | 500101143139982 | 11:34:13 |
| MERCHANT CHANGE | CHICO'S | 65.00 | 0 | 500101151546850 | 11:46:32 |
| MERCHANT CHANGE | CHICO'S | 50.00 | 0 | 500101127553443 | 11:55:46 |
| MERCHANT CHANGE | EXPRESS | 60.00 | 0 | 500101151066474 | 11:56:11 |
| MERCHANT CHANGE | CHICO'S | 50.00 | 0 | 500101127561446 | 11:56:29 |
| MERCHANT CHANGE | EXPRESS | 10.00 | 0 | 500101145514747 | 12:05:24 |
| MERCHANT CHANGE | EXPRESS | 50.00 | 0 | 500101151561446 | 12:08:45 |
| MERCHANT CHANGE | EXPRESS | 75.38 | 0 | 500101151595788 | 12:14:13 |
| MERCHANT CHANGE | GAP KID'S/BABY GAP | 30.11 | 0 | 500101143139982 | 12:31:25 |
| MERCHANT CHANGE | CHICO'S | 75.38 | 0 | 500101132074468 | 12:57:53 |
| MERCHANT CHANGE | HEREFORD HOUSE | 15.25 | 0 | 500101103976151 | 13:18:22 |
| MERCHANT CHANGE | HOULIHANS | 10.62 | 0 | 500101146223844 | 13:20:52 |
| MERCHANT CHANGE | HEREFORD HOUSE | 14.75 | 0 | 500101103976151 | 13:25:41 |
| MERCHANT CHANGE | GALYAN'S | 24.42 | 0 | 500101143857174 | 13:47:03 |
| MERCHANT CHANGE | LA DOLCE VITA | 25.00 | 0 | 500101139160085 | 14:06:09 |
| MERCHANT CHANGE | COLDWATER CREEK | 240.00 | 0 | 500101147114747 | 14:33:44 |
| MERCHANT CHANGE | BATH & BODY WORKS | 30.00 | 0 | 500101151470785 | 14:41:12 |
| MERCHANT CHANGE | BARNES AND NOBLE | 15.00 | 0 | 500101121093364 | 14:47:28 |
| MERCHANT CHANGE | GYMBORIE | 50.00 | 0 | 500101144665377 | 14:57:59 |
| MERCHANT CHANGE | GYMBORIE | 10.22 | 0 | 500101144673681 | 14:58:57 |
| MERCHANT CHANGE | PANERA BREAD BAKERY & CAFE | 2.09 | 0 | 500101151355361 | 15:04:01 |
| MERCHANT CHANGE | BARNES AND NOBLE | 50.00 | 0 | 500101142511446 | 15:08:37 |
| MERCHANT CHANGE | BARNES AND NOBLE | 25.41 | 0 | 500101142651857 | 15:08:47 |
| MERCHANT CHANGE | THE YANKEE CANDLE CO. | 28.75 | 0 | 500101144673681 | 15:28:35 |
| MERCHANT CHANGE | THE WHITE HOUSE/ BLACK MARKET | 75.00 | 0 | 500101152528857 | 15:55:03 |

METHODS AND SYSTEMS FOR PROCESSING, ACCOUNTING, AND ADMINISTRATION OF STORED VALUE CARDS

CROSS REFERENCE TO RELATED APPLICATIONS

This application is a continuation application of U.S. patent application Ser. No. 10/927,684, filed Aug. 27, 2004 now U.S. Pat. No. 7,797,233 which is a continuation-in-part application of U.S. patent application Ser. No. 10/354,776, filed Jan. 30, 2003 which claims the benefit of U.S. Provisional Application Ser. No. 60/352,960, filed Jan. 30, 2002.

BACKGROUND OF THE INVENTION

This invention relates generally to the facilitating of transactions, and more specifically to systems and methods for facilitating the issue of stored value, gift cards and the account management, processing, and settlement of transactions by banks, credit unions, or third party processors. The consumer acceptance of stored value cards, such as monetary gift cards issued by retail merchants to consumers, has proliferated in recent years. Transactions which take place utilizing these cards have been conducted utilizing proprietary, closed networks operated within the point of sale systems deployed by the said merchant and electronic funds transfer networks.

Banks and credit unions have not participated in the issue of stored value cards since products, services, and system gateways typically do not exist between their core accounting systems and proprietary merchant point of sale systems. Given the growth of the stored-value card industry, banks and credit unions have investigated different means to offer these plastic card based services.

Real estate developers who own retail shopping malls have also expressed a desire to participate in offering monetary, stored-value cards to consumers as a replacement for paper gift certificates currently purchased by consumers. Paper gift certificates typically are printed with a bank routing and transit number that enables the certificate to be cashed or deposited by any merchant or financial institution both within, and outside of, the mall. In addition, for those consumer transactions completed with amounts lower than face value limit of the certificate, the mall merchant must return cash to the consumer versus additional products or services.

Both shopping malls and merchants within the geography of the mall desire certificates to be replaced with private label, monetary, stored value, gift cards. These gift cards must be issued by a bank or credit union and operate seamlessly across a variety of merchant point of sale machines using the existing debit and credit card networks, such as VISA, MasterCard, American Express, and Discover, typically connected to the existing merchant point of sale machines. The gift card transactions must be limited to merchants within the boundaries defined by the shopping mall or developer who manages multiple malls.

Two types of gift card products, branded and private label, are typically available from the debit and credit card networks. A branded card product where the network logo is placed on the card must be accepted universally at all merchants worldwide. A private label card that utilizes the debit and credit card networks but does not include the logo associated with the network can be limited to a subset of the merchants who accept the card. The private label card services requires a database and profile of the merchants to be created and maintained in order to perform the merchant matching procedures associated with limited use.

Typically, holders of these stored value, gift cards are anonymous in nature. That is, if a card is lost, the finder of the card is able to utilize any remaining funds on the card as if it was his own.

Another problem with the anonymity is that a card holder has difficulty in determining a balance of the stored value remaining on the card. Either the user has to manually track the stored value remaining on the card, or some processors, typically those associated with shopping malls, deploy specialized card reading machines which provide a balance remaining to the user when the card is scanned. However, when the user attempts to utilize the stored value card for a transaction within the shopping mall, for example at a restaurant or a clothing store, and has not previously determined the remaining value on the card, the transaction may be denied for lack of monetary value on the card.

Still another problem is that the individual establishments within the mall typically only have access to one electronic funds transfer system through a point-of-sale (POS) terminal, and the stored value cards are not completely compatible with these electronic fund transfer systems and terminals. The problem for the shopper is that when the transaction is denied, the shopper is only notified of the denial, and is not provided with balance data. In a real world example, if the shopper is attempting to make a $35.00 purchase with a stored value card which has $25.00 of stored value, he or she is typically unable to complete the transaction utilizing $10.00 of cash or perhaps a credit or debit card to make up the difference as a split-tender.

Another desire of merchants and developers is to enable stored-value, gift cards to be reloaded upon the depletion of the funds available through the card. The process of reloading the cards with additional monetary funds must be completed through various mediums such as client terminals located at mall customer service desks, through Internet web services, or through ISO 8583 debit card transactions credit funds to the account of the card holder. In addition, merchants desire loyalty programs to be delivered in association with the reloading of the gift card where merchant monetary dividends would be posted into the account of the card holder. The anticipated result is loyalty created between merchants and consumers and monetary compensation is passed back to the consumer in reward of this merchant loyalty.

BRIEF SUMMARY OF THE INVENTION

In one aspect, a method for completing a stored value card transaction utilizing a gateway into a national, ISO 8583 electronic funds transfer service is provided. The method comprises receiving at the gateway an ISO 8583 formatted message originally generated by the point of sale system of a retail merchant, parsing the message into a series of data elements representing at least a transaction amount, a transaction type, a merchant ID, a bank identification number, an institution ID, a branch ID, and an account identifier, and validating the merchant ID exists within the merchant database assigned to the issued card. The method further comprises routing the message through a switch controller to an account holder database based on the institution ID and the branch ID, accessing an account within the database utilizing the account key, determining if an account holder's monetary balance in the account is greater than or equal to the transaction amount, formatting transaction data, the transaction data including at least a transaction amount, a bank ID number, an institution ID, a branch ID, and an account key, into an ISO- 8583 compatible message, and transmitting one of an authorization approval or a denial based upon the determination.

In another aspect, an accounting system for regional malls, operators of malls and developers is provided. The accounting system performs as a transaction processing center and comprises a database and file system which includes at least one of anonymous and known consumer account data and a plurality of retail merchant and mall office workstations running client applications networked over LANs and secure WANs. The system also comprises a secure Internet banking gateway that receives inquiries from at least one of consumers utilizing at least one of the Internet, a telephone system, and point of sale terminals, card dispensing machines, and the retail merchant and mall office workstations, and the consumers and workstations requesting account balances and transaction history to be delivered via web services. The system also comprises a telephone gateway that receives inquiries from at least one of consumers and the retail merchant and mall office workstations requesting account balances and transaction histories, the inquiries being answered utilizing stored voice recordings. The system further comprises an electronic funds transfer (EFT) gateway networked into one or more ISO 8583 electronic funds transfer services, at least one funds settlement gateway into at least one of the Federal Reserve ACH network and corporate credit union automated settlement network, and a messaging and switch controller used to simultaneously route stored value card transactions and client initiated transactions from at least one of said gateways.

BRIEF DESCRIPTION OF THE DRAWINGS

FIG. 9 is an illustration of a receipt from a point-of-service machine providing an alphanumeric card balance of zero.

FIG. 16 is a sample report for an end of day account transaction detail by property.

FIG. 17 is a sample report for the daily redemption of merchant transactions completed at a mall property.

DETAILED DESCRIPTION OF THE INVENTION

Figure 1:
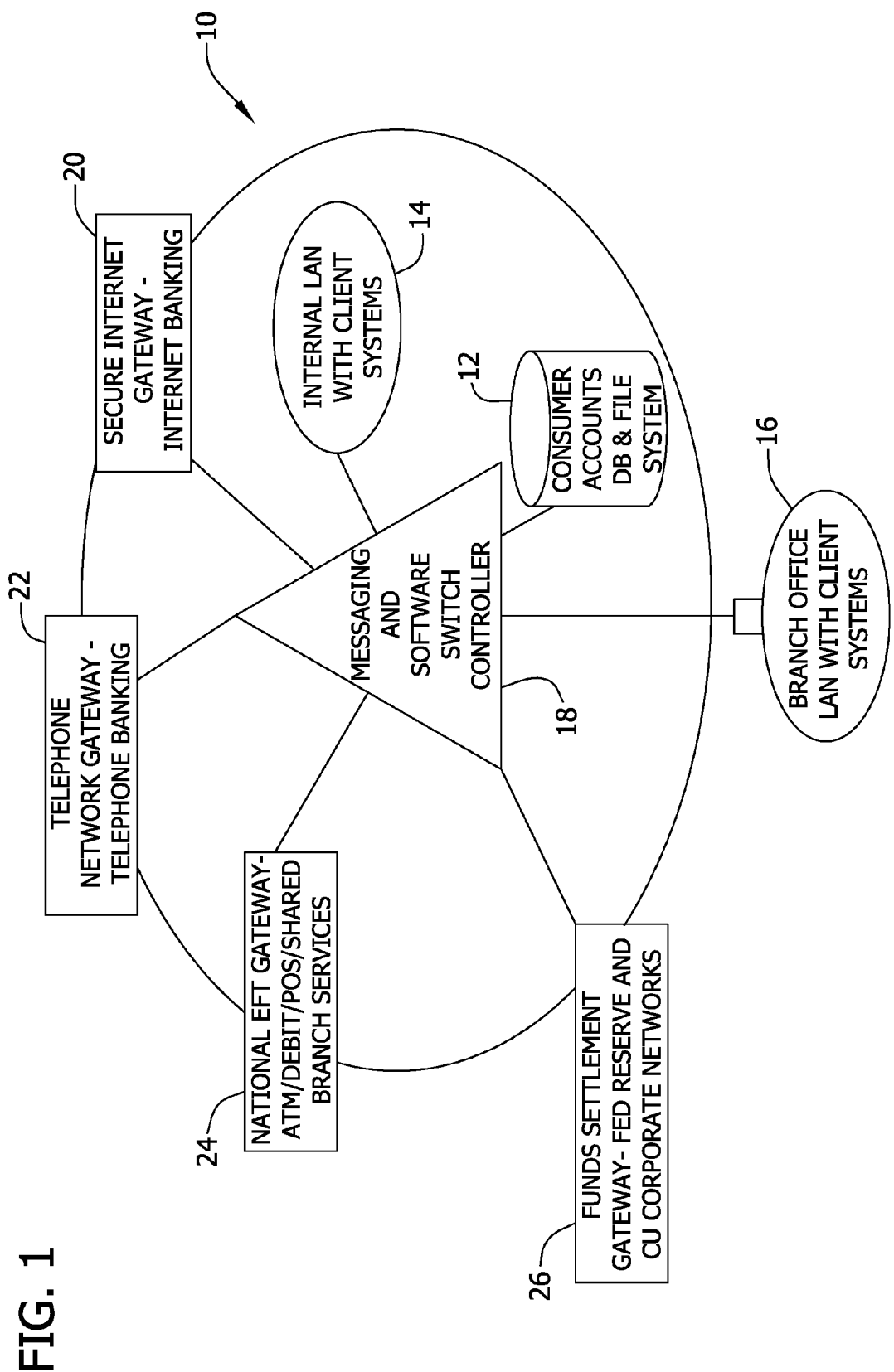
FIG. 1 is a block diagram of a core network of financial transaction systems.

A variety of stored value card platforms is described that are offered by banking institutions and credit unions to merchants, retail center owners, and consumers that result from the integration of banking and credit union accounting practices, systems and services, national and international settlement and electronic transaction networks. Anonymous gift card services, enabled by stored value cards and offered by merchants, mall operators and developers, are enabled by the mapping and switching of transactions that historically have not crossed business boundaries of the diverse, highly regulated, financial industries and regional merchants or mall developers. Several diverse industry standards are mapped together via computer software programs and electronic switching and transaction networks to perform the necessary accounting system interfaces between the diverse industry groups.

In one embodiment, a typical banking or credit union system architecture is applied to the needs of the shopping mall operators and developers. The bank accounting system must adhere to the practices and use of customizable parameter files that allow a mall or developer to set key variables such as fee thresholds and assign periods of time before a card holder account becomes dormant. The banking system also provides a hierarchical numbering plan that will enable a developer to issue cards to one or many malls and complete daily balancing procedures for each mall or across all malls as necessary. The numbering plan and system architecture enable cards to be issued and redeemed at a single mall or merchant within a geographic location, issued and redeemed at a multiplicity of malls or merchants with no geographical limitations, or issued in subsets of merchants affiliated within a common loyalty program.

All the products and services offered by the financial services industry are enabled for the anonymous card holder via the mall accounting system. In essence, the mall performs the financial services consistent with the bank.

One significant benefit of the banking system is the inherent tracking of dormant accounts that is required for the gift card service offered by malls. Consistent with state escheatment laws, malls and developers are allowed to charge service fees, sometimes referred to as account maintenance fees, against dormant accounts after a period of time normally ranging from six to eighteen months. These fees may be charged until the card expires or the balance on the card is reduced to zero. In one embodiment, service fees for the gift card, which typically begin after six months with branded cards, can be postponed until a desired time utilizing system 10. Postponement of service fees is thought to result in establishing good will with the customers of groupings of merchants.

Managing the account balances including historical transactions for current as well as dormant accounts is one feature of the herein described accounting system deployed for malls and developers. Sophisticated bank or credit union systems maintain online transaction gateways with the national electronic funds transfer (EFT) networks that conform to the ISO 8583 international standard enabling card services such as debit, ATM, and point of sale services to be delivered to the consumer. This national standard has been implemented across a variety of merchant point of sale systems allowing a seamless transfer of purchasing transactions to be passed across national and international EFT networks linking merchants, banks and credit unions across the globe.

In a similar solution, malls performing as card issuers use the ISO 8583 gateway to carry stored value card transactions to accounting databases representing the card holder accounts. Using the dividend calculation and accounting structure established for bank and credit union customers, gift card issuers deploy a merchant loyalty program that is based upon a pre-approved percentage of the sale (e.g. 10%) to be paid as a dividend to the card holder account as a reward to their demonstrated loyalty and business brought to the participating merchant. For banks and credit unions, these dividend programs exist today and are typically calculated each month or quarter for savings, CD's and Individual retirement accounts.

Funds settlement between the mall gift card issuer, banks, credit unions and national EFT networks is completed for stored-value cards using proven operational systems. Transfers between financial institutions are, at least in part, handled utilizing an automated clearinghouse network (ACH). The ACH Network is a batch processing, store-and-forward system. Transactions received by the financial institution during the day are stored and processed later in a batch mode. Rather than sending each payment separately, ACH transactions are accumulated and sorted by destination for transmission during a predetermined time period. This provides significant economies of scale. It also provides faster processing than paper checks, which must be physically handled. Instead of using paper to carry necessary transaction information, ACH transactions are transmitted electronically between financial institutions through data transmission. Typically, five participants are involved in an ACH transaction: the originating company or individual (Originator), the Originating Depository Financial Institution (ODFI), the ACH Operator, the Receiving Depository Financial Institution (RDFI), and the receiving company, employee or customer (Receiver).

The Originator is an entity that agrees to initiate ACH entries into the payment system according to an arrangement with a Receiver. The Originator is usually a company directing a transfer of funds to or from a consumer's or another company's account. In the case of a Customer Initiated Entry (CIE), the Originator may be an individual initiating funds transfer activity from his or her own account. The term "company" is intended to represent the Originator of electronic ACH entries and does not imply exclusion of other types of organizations (i.e., Federal, state and local government agencies). An Originator may be either a company or a consumer.

From a system architecture perspective, FIG. 1 illustrates a core network of financial transaction processing systems 10 typically combined to offer a suite of financial services, including funds transfer and electronic banking transactions, to banking customers and members of credit unions. Processing system 10 includes a relational database and electronic file system 12 of consumer and business accounts that contain information about every account holder associated with the bank or credit union. In one embodiment, database 12 includes name and address information, a variety of financial accounts such as checking, savings, loans, and investments such as certificate of deposit and investment retirement accounts. Database 12 typically resides on secure computer servers (not shown) with highly redundant components to maintain the integrity of the account holder files.

Database 12 is accessed by clients through file servers utilizing PC workstations 14, which are logically combined by a LAN or remotely linked to branch offices 16 by a WAN. Utilizing workstations 14, clients create transaction messages that initiate the primary financial services of deposit, withdrawal, account transfer, inquiry, and file maintenance for their accounts residing in database 12.

The clients transactions are routed by a software messaging and switch controller 18 that in one embodiment utilizes TCP/IP socket communications to establish logical network connections between the clients and servers to transfer data and complete core accounting functions.

Both manual and automated clients drive a variety of transactions against account holder database and file system 12. These may include electronic clients residing in gateways into the Internet 20, public telephone systems 22, national Electronic Funds Transfer (EFT) networks (ATM, Point of Sale, Debit Card, and Shared Branch) 24, and national funds settlement networks operated by the Federal Reserve and Corporate Credit Union system 26.

Each of these different gateways operate utilizing message formats that have been standardized across the industry or using proprietary formats that have been created by vendors who deliver products in support of the banking and credit union industries. Often, the gateways into the various networks described above complete a mapping of transactions into a common format that allows the primary financial services of deposit, withdrawal, account transfer, inquiry, and file maintenance to be completed seamlessly across system 10.

System 10 also provides functions such as administration and management reporting, settlement, statement generation, financial projections, interest calculations, amortization, and overall general ledger functions required to manage the bank and credit union as required by federal regulations.

Figure 2:
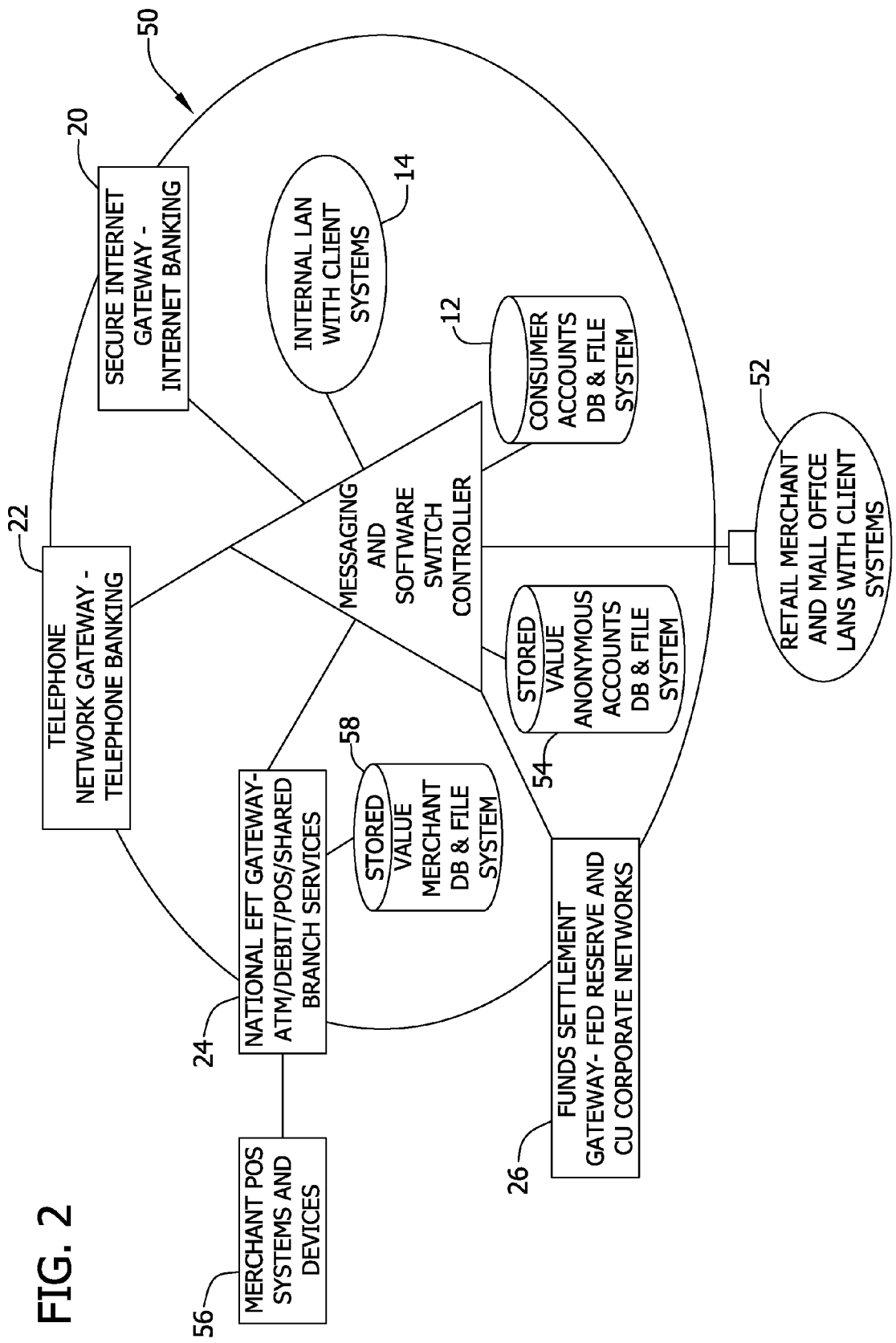
FIG. 2 is a diagram of the system of FIG. 1 with an additional stored value card databases, gateways, and settlement systems.

FIG. 2 illustrates the enhancements required for the bank or credit union platform that enable the system of FIG. 1 to be customized for malls and developers who offer stored-value, gift card services. Referring to FIG. 2, system 50 includes an accounting system with client systems 52 for regional malls, operators of malls and developers that includes a database and file system 54 which includes both anonymous and known consumer account data. These databases may be accessed via workstations (not shown) located at the retail merchant and mall office and networked over LANs and secure WANs.

A client application is deployed at the client system 52 and this application enables cards to be issued at the mall customer service desk using tools such as a magnetic card swipe reader to populate and match the cards with pre-loaded accounts at the consumer 12 and anonymous account databases 54.

The mall or developer network is dependent upon access through the national EFT networks operated by VISA, MasterCard, Discover, and American Express, or regional operators such as FDR, STAR, and PLUS to access the point of sale systems and devices 56 at participating merchant offices. These devices and systems utilize the ISO 8583 standard protocol when generating and receiving transactions during the purchase and authorization processes. As such, the gift card systems and methods described herein do not require any changes to any point-of-sale system that accepts branded cards and no additional equipment is needed at merchant locations.

Other components include a stored-value, merchant database and filing system 58 that is assigned to each of the cards issued by malls or developers. Transactions are validated against this database during the process of transaction authorization.

A secure Internet banking gateway 20 is deployed that receives inquiries from at least one of consumers utilizing at least one of the Internet, a telephone system, and point of sale terminals, card dispensing machines, and said retail merchant and mall office workstations, the consumers and workstations requesting account balances and transaction history to be delivered via web services.

A telephone gateway 22 is deployed that receives inquiries from at least one of consumers and said retail merchant and mall office workstations requesting account balances and transaction histories, the inquiries being answered utilizing stored voice recordings.

Figure 3:
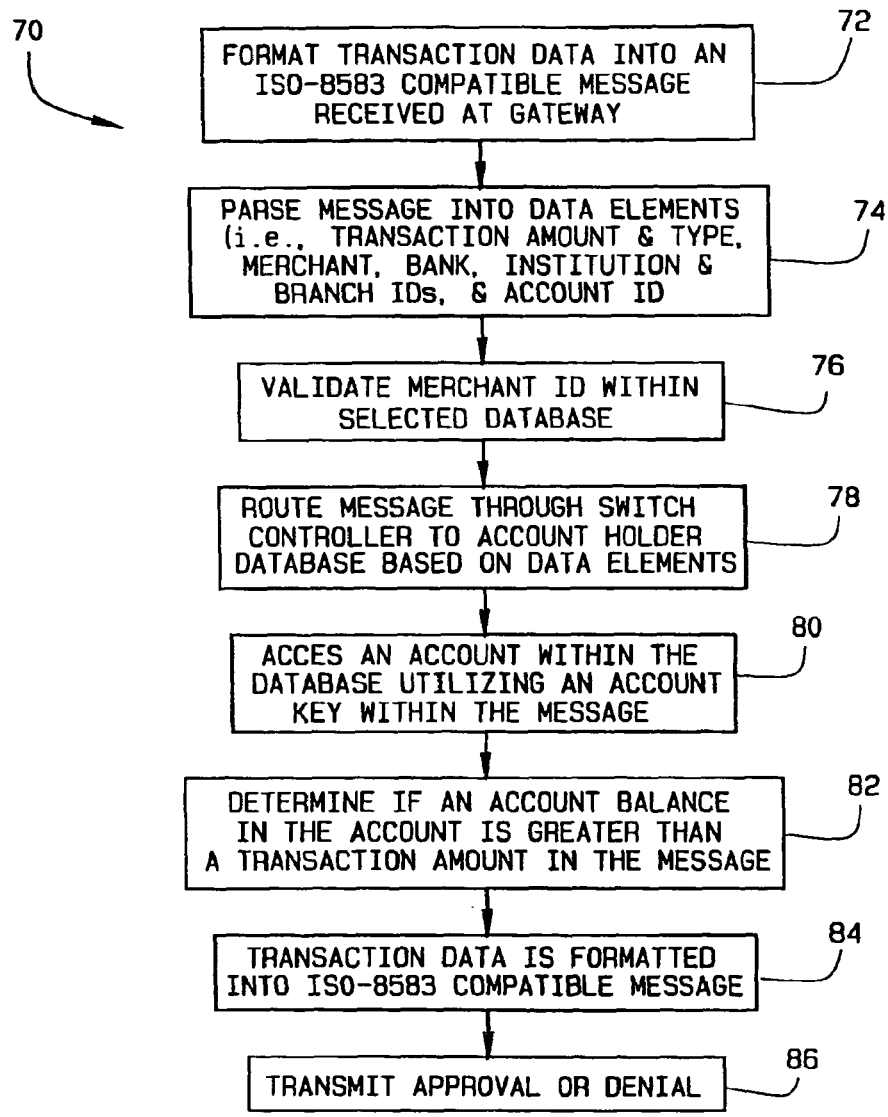
FIG. 3 is a flowchart of a transaction processing method performed by the system of FIG. 2.

FIG. 3 is a flowchart 70 of the transaction processing method of the flowchart performed by the system of FIG. 2. In one embodiment, the method is for completing a stored value card transaction utilizing the above described gateway into a national, ISO 8583 electronic funds transfer service. Referring specifically to FIG. 3, an ISO 8583 formatted message originally generated by the point of sale system of a retail merchant is received 72 at the gateway. The received 72 message is parsed 74 into a series of data elements representing at least, but not limited to, a transaction amount, a transaction type, a merchant ID, a bank identification number, an institution ID, a branch ID, and an account identifier. The merchant ID is validated 76 to ensure the ID exists within the merchant database assigned to the issued stored value card. In one embodiment, one of the data elements includes data relating to a language selection by a user which results in creation, storage, and delivery of character strings, similar to those described herein, in the selected language.

The message is routed 78 through a switch controller to an account holder database based on the institution ID and the branch ID and an account is accessed 80 within the database utilizing the account key. It is determined 82 whether an account holder's monetary balance in the account is greater than or equal to the transaction amount. Transaction data, which includes at least a transaction amount, a bank ID number, an institution ID, a branch ID, and an account identifier, is formatted 84 into an ISO-8583 compatible message and one of an authorization approval or a denial, based upon the determination, is transmitted 86.

Figure 4:
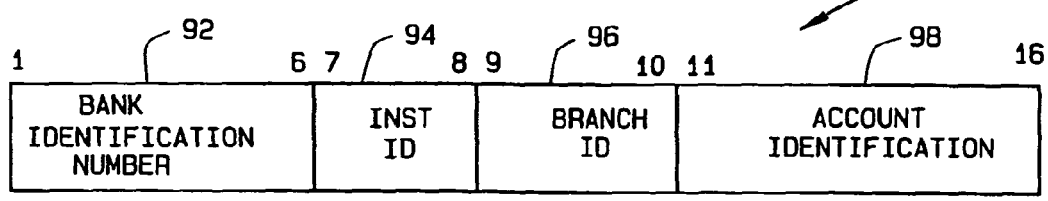
FIG. 4 is an example numbering plan for a stored value card system.

FIG. 4 is an example numbering plan for a stored value card system. At least a portion of transaction data is included in a stored value card account number, as illustrated in FIG. 4. In one embodiment, an account number 90 for the card is a 16 character string. Specifically, and in one embodiment, a six character field is defined as a bank identification number 92, a two character field is defined as an institution ID 94, which, for example, identify a developer or an owner of several malls or shopping centers for the stored value card. A branch ID 96 is a two character identifier for which particular mall or shopping center of the developer from which the card is or is to be issued. A six character account identifier 98 is utilized to identify individual stored value cards. Such numbering plans and card encoding provide risk avoidance and fraud detection procedures while still complying with the procedures created for settlement of electronic funds transfers. As a merchant list for the stored value cards is controlled, fraudulent activities can be immediately identified, whereas, fraudulent activities with a branded card good at 30 million locations cannot.

In one embodiment, when utilizing the stored value card, the ISO-8583 formatted message that is generated includes a transaction code which signifies that the desired transaction is at least one of a deposit, a withdrawal, a transfer, and a balance inquiry.

Figure 5:
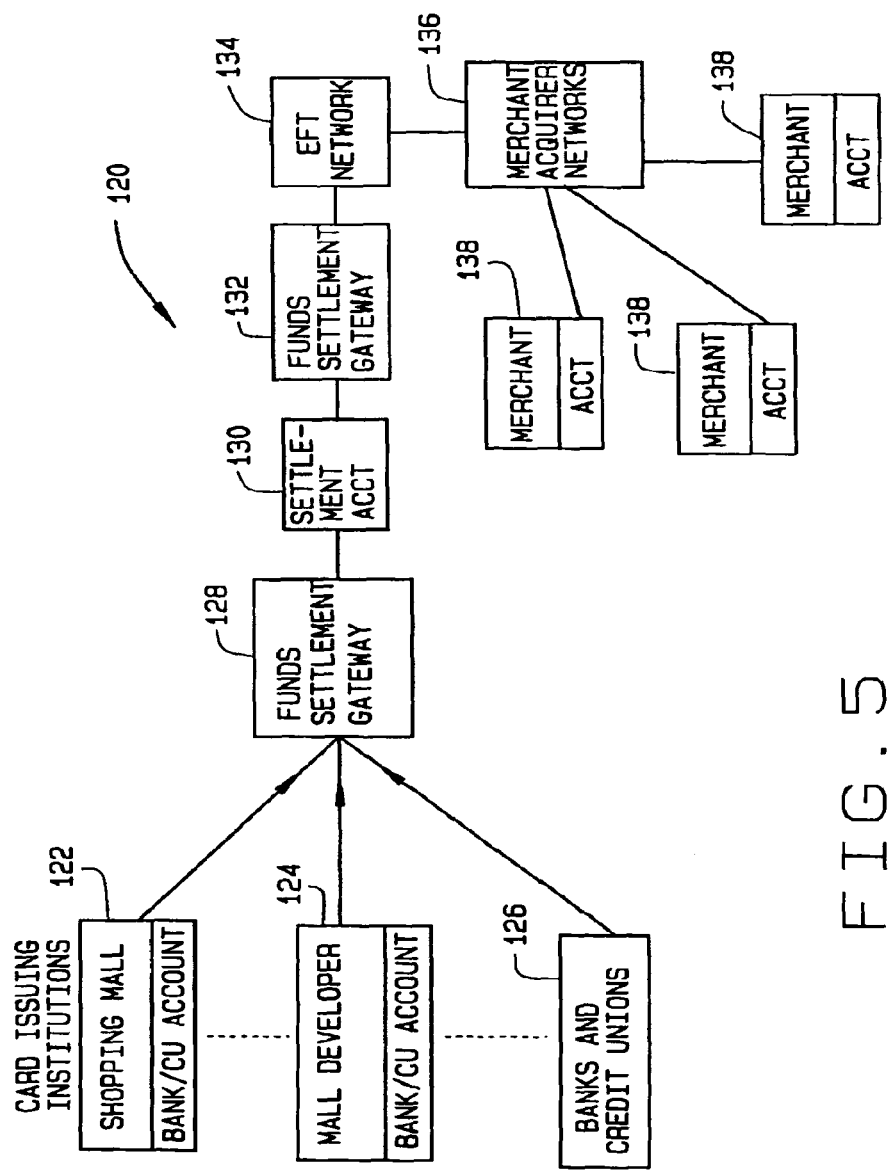
FIG. 5 illustrates one embodiment of a settlement process.

FIG. 5 diagrams a settlement process 120 for issuance and usage of stored value cards utilizing system 50 as above described. Referring specifically to FIG. 5 card issuing institutions, for example, shopping malls 122, mall developers 124 and banks and credit unions 126 provide transaction data to a funds settlement gateway 128, for example, via a secure data network connection. The transaction data is utilized to credit or debit a settlement account 130. The funds from settlement account 130 are, in one embodiment, wired to a second funds settlement gateway 132 which provides access to an electronic funds transfer network 134. Electronic funds transfer network 134 provides a transfer of the funds to merchant acquirer networks 136, which are configured to credit and debit, as the individual cases may be, accounts of individual merchants 138, for example.

In one embodiment, at least some of the funds transfer files are compatible with the Federal Reserve banking system file formats and at least some of the funds transfer files are compatible with Corporate Credit Union automated settlement network file formats. Funds equal to the total within each funds transfer file transferred to settlement account 130 as described above utilizing known distribution methods.

In one embodiment, for a balance inquiry, a balance inquiry message is created when the account holders' monetary balance is less than a point of sale transaction amount. An ISO 8583 response code for declining the authorization request is selected, and an alpha-numeric string containing the current account balance and text message describing the reason for declining the transaction is created.

The response code and alpha-numeric string is formatted into an ISO 8583 compatible message and an authorization denial is transmitted to the gateway where it is routed to the originating merchant point of sale device. Finally, a text message is displayed at the point of sale which indicates the denial, but also provides an available balance on the stored value card which, for example, the merchant can provide to the holder of the stored value card.

Figure 6:
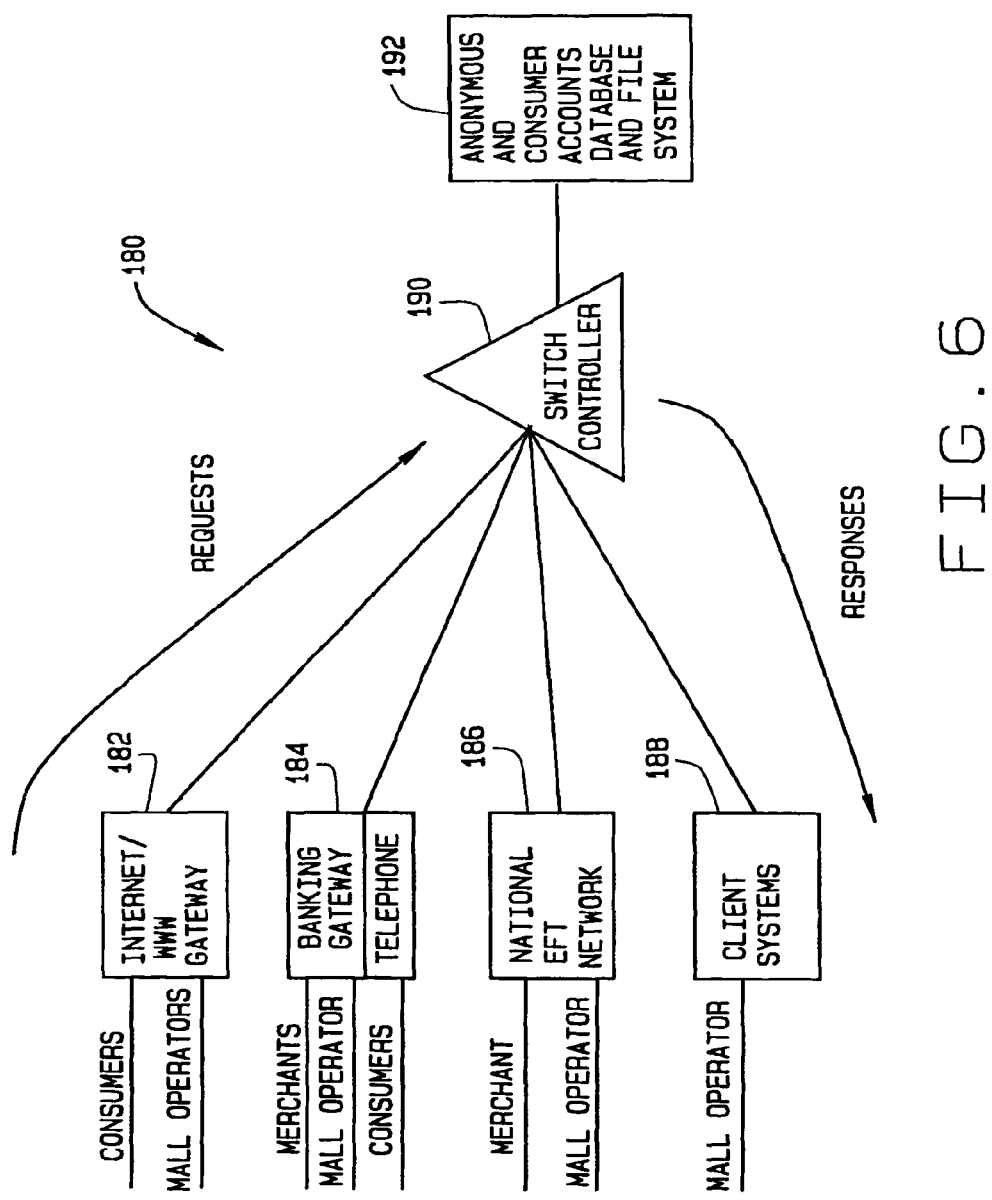
FIG. 6 illustrates a process for completing balance inquiries utilizing the system shown in FIG. 2.

FIG. 6 diagrams a process 180 for balance inquiries utilizing the system of FIG. 2. In one embodiment, consumers and mall operators utilize internet gateways 182 to initiate and receive results of balance inquiries, A banking gateway 184 is utilized by one or more of merchants, mall operators, and consumers, typically through telephone banking, for balance inquiries. Certain merchants and mall operators can access national electronic funds network 186 for balance inquiry operations. Other mall operators utilize client systems 188 which provide a mechanism for balance inquiries. All inquiries are routed to switch controller 190, which as described above, can access an anonymous and consumer accounts database and file system 192. Upon receipt of the individual account balance being inquired, switch controller 192 provides a response to the requester, which includes approval or denial and the account balance information that can be supplied to the card user as described above.

Figure 7:
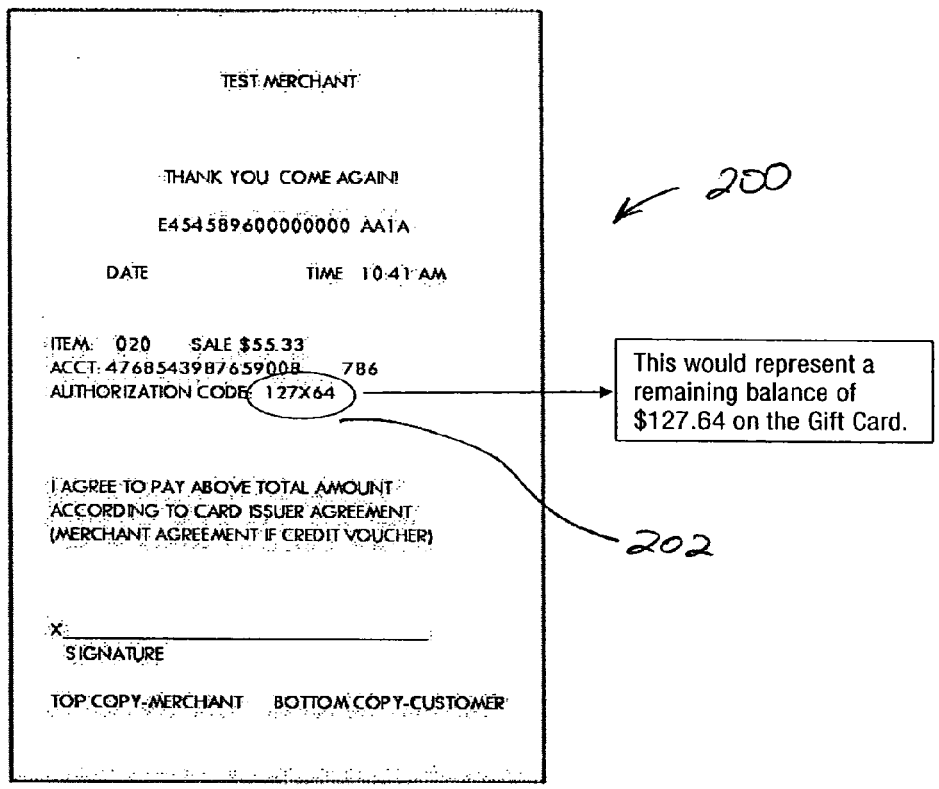
FIG. 7 is an illustration of a receipt from a point-of-service machine providing an alphanumeric card balance of more than one dollar.

FIG. 7 is an illustration of a receipt 200 from a point-of-service machine providing an alphanumeric card balance of more than one dollar. Receipt 200 is similar to known credit/debit card receipts as it provides a signature block, date, time, sale amount, vendor information and account number. However, and as described above, an authorization code 202 provides an alphanumeric representation of the balance remaining on a gift card. Specifically, in the embodiment shown, a balance of $127.64 remains, and the decimal point is represented by the letter "X".

Figure 8:
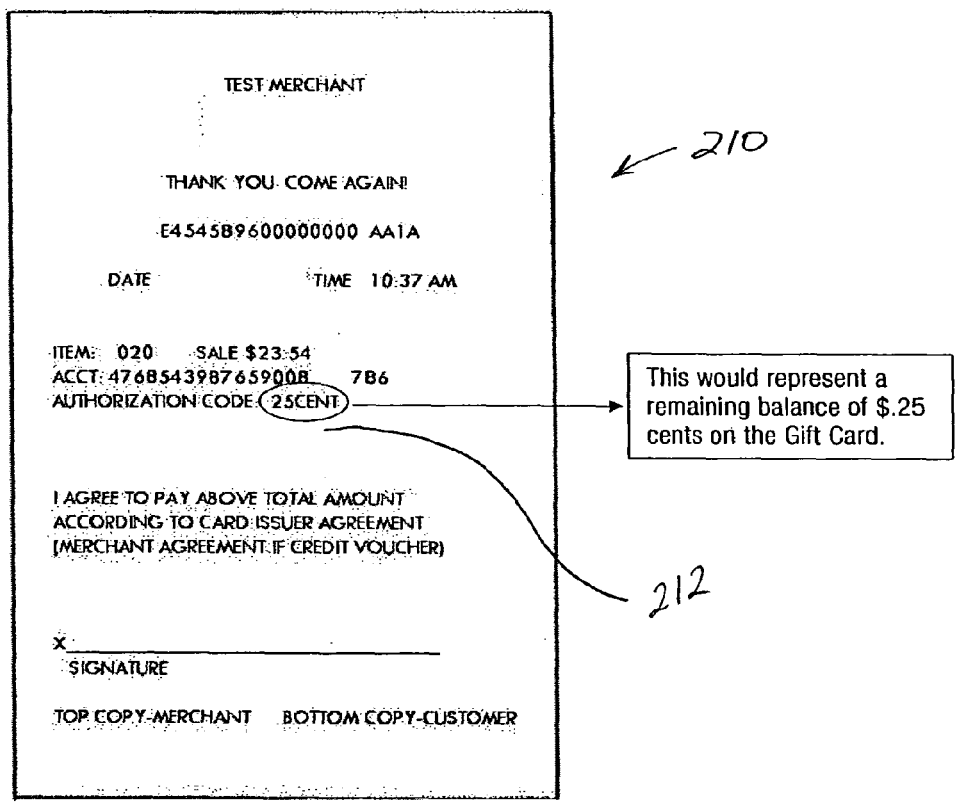
FIG. 8 is an illustration of a receipt from a point-of-service machine providing an alphanumeric card balance of less than one dollar.

FIG. 8 is an illustration of a receipt 210 from a point-of-service machine providing an alphanumeric card balance of less than one dollar. Receipt 210 is similar to receipt 200 other than authorization code 212 includes the characters "25CENT", which indicates a balance of 25 cents remaining on the gift card. FIG. 9 is an illustration of a receipt 220 from a point-of-service machine providing an alphanumeric card balance of zero. Again, receipt 220 is similar to receipt 200 other than authorization code 222 includes the characters "1EMPTY", which indicates a zero balance remaining on the gift card.

While the embodiments described with respect to FIGS. 7-9 are representative of sales transactions, the systems and methods described herein provide additional functionalities. For example, and in one embodiment, a transaction amount of $0.01 (one cent) is interpreted by system 10 as a balance inquiry. The $0.01 transaction results in system 10 returning the current gift card balance via the authorization code as shown in FIG. 7-9. Known systems are limited to utilization of numerical characters within the authorization code. System 10 provides an alternative to this industry trend by utilization of alphanumeric characters, as opposed to only numbers within the authorization code, as described above.

Figure 10:
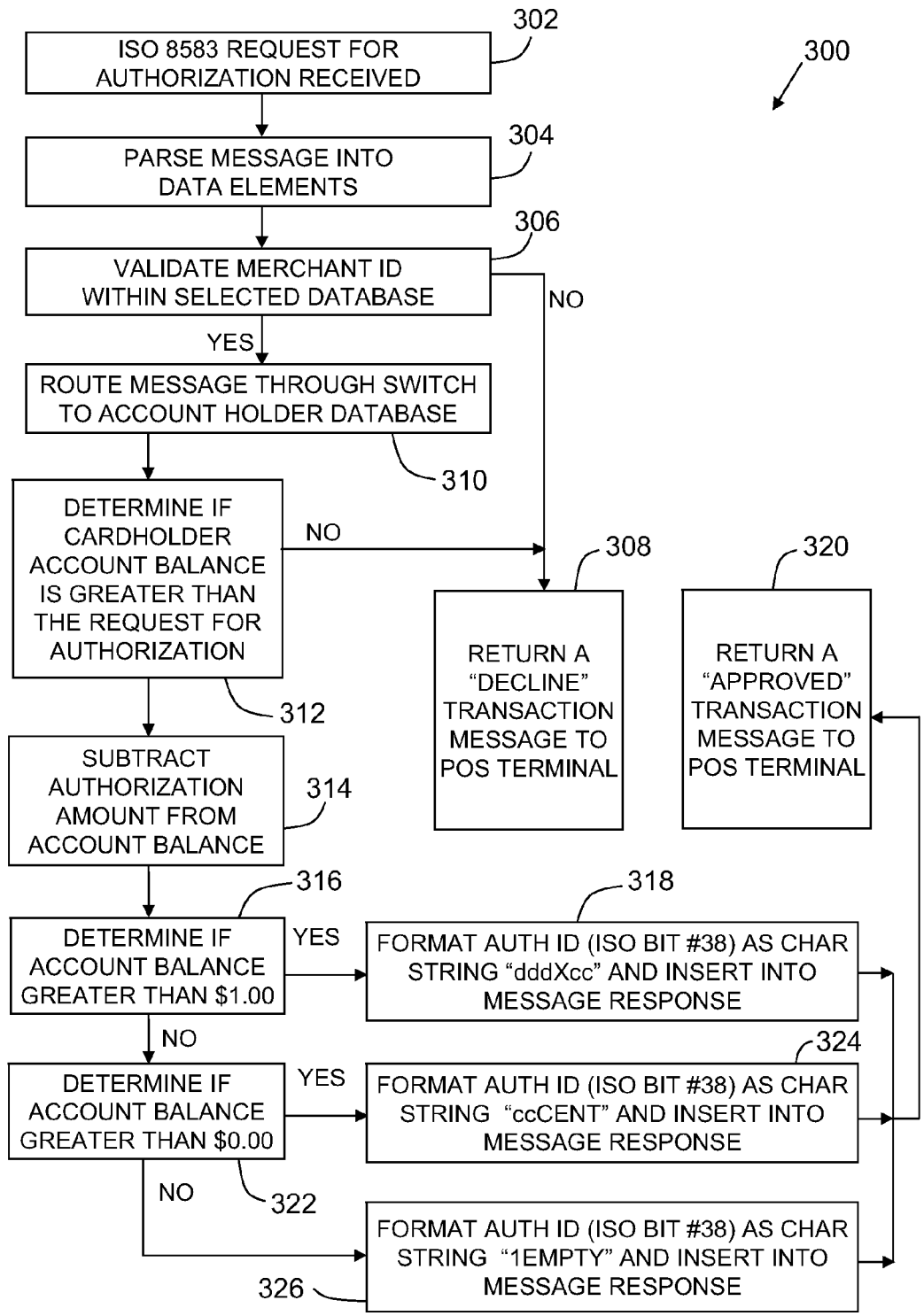
FIG. 10 is a flowchart illustrating a process for creating an alphanumeric receipt for a card balance returned within an authorized message or balance inquiry.

FIG. 10 is a flowchart 300 illustrating a process for creating an alphanumeric receipt for a card balance returned within an authorized message or balance inquiry. An ISO 8583 request for authorization is received 302. The received message is parsed 304 into data elements, and a merchant ID data element is validated 306 as being within a selected database. If the merchant ID is not within the selected database, a decline transaction message is returned 308 to an originating point of sale terminal. If the merchant ID is within the selected database, the received message is routed 310 through a switch to an account holder database. It is then determined 312 if a cardholder account balance is greater than the requested authorization amount included in the received message. If not, a decline transaction message is returned 308 to the originating point of sale terminal.

If the cardholder account balance is greater than the requested authorization amount, the authorization amount is subtracted 314 from the account balance. If the remaining account balance is determined 316 to be greater than $1.00, the authorization ID (ISO bit #38) is formatted 318 so that the authorization response includes the character string "dddXcc" indicating the dollars (ddd) and cents (cc) balance remaining on the gift card. An approved transaction message including the character string is then returned 320 to the originating point of sale terminal. If the remaining account balance is determined 322 to be less than $1.00, but more than $0.00, the authorization ID (ISO bit #38) is formatted 324 so that the authorization response includes the character string "ccCENT" indicating the cents (cc) balance remaining on the gift card. An approved transaction message including the character string is then returned 320 to the originating point of sale terminal.

If the remaining balance is not greater than $0.00 (e.g., a zero balance remaining), the authorization ID (ISO bit #38) is formatted 326 so that the authorization response includes the character string "1EMPTY" indicating the a zero balance remaining on the gift card. An approved transaction message including the character string is then returned 320 to the originating point of sale terminal.

Figure 11:
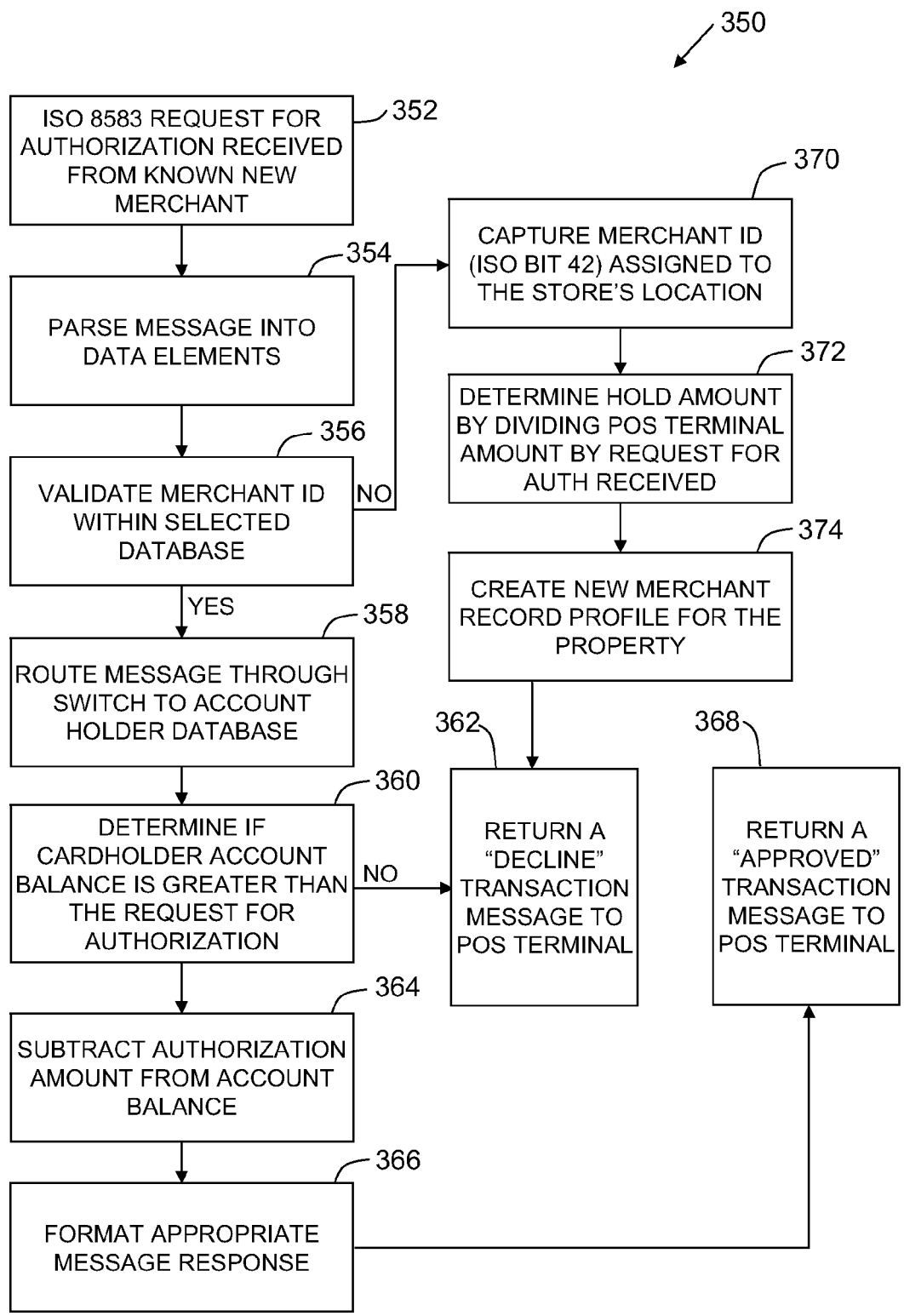
FIG. 11 illustrates a process for capturing the merchant ID and building the merchant profile supporting future cardholder requests for redemption.

FIG. 11 is a flowchart 350 illustrating a process for capturing the merchant ID and building a merchant profile supporting future cardholder requests for redemption. An ISO 8583 request for authorization is received 352 from a known new merchant. The received message is parsed 354 into data elements, and a merchant ID data element is validated 356 as being within a selected database. If the merchant ID is within the selected database, the received message is routed 358 through a switch to an account holder database. It is then determined 360 if a cardholder account balance is greater than the requested authorization amount included in the received message. If not, a decline transaction message is returned 362 to the originating point of sale terminal.

If the cardholder account balance is greater than the requested authorization amount, the authorization amount is subtracted 364 from the account balance and an appropriate message response is formatted 366 according to the remaining card balance as described above. An approved transaction message including the appropriate character string within the message response is then returned 368 to the originating point of sale terminal.

If the merchant ID is not within the selected database, the new merchant ID is captured 370 and assigned to the store's location. A hold amount is determined 372 by dividing a point of sale terminal amount by a request for authorization that has been received. A new merchant profile record is created 374 for the property and a decline transaction message is returned 362 to the originating point of sale terminal.

Figure 12:
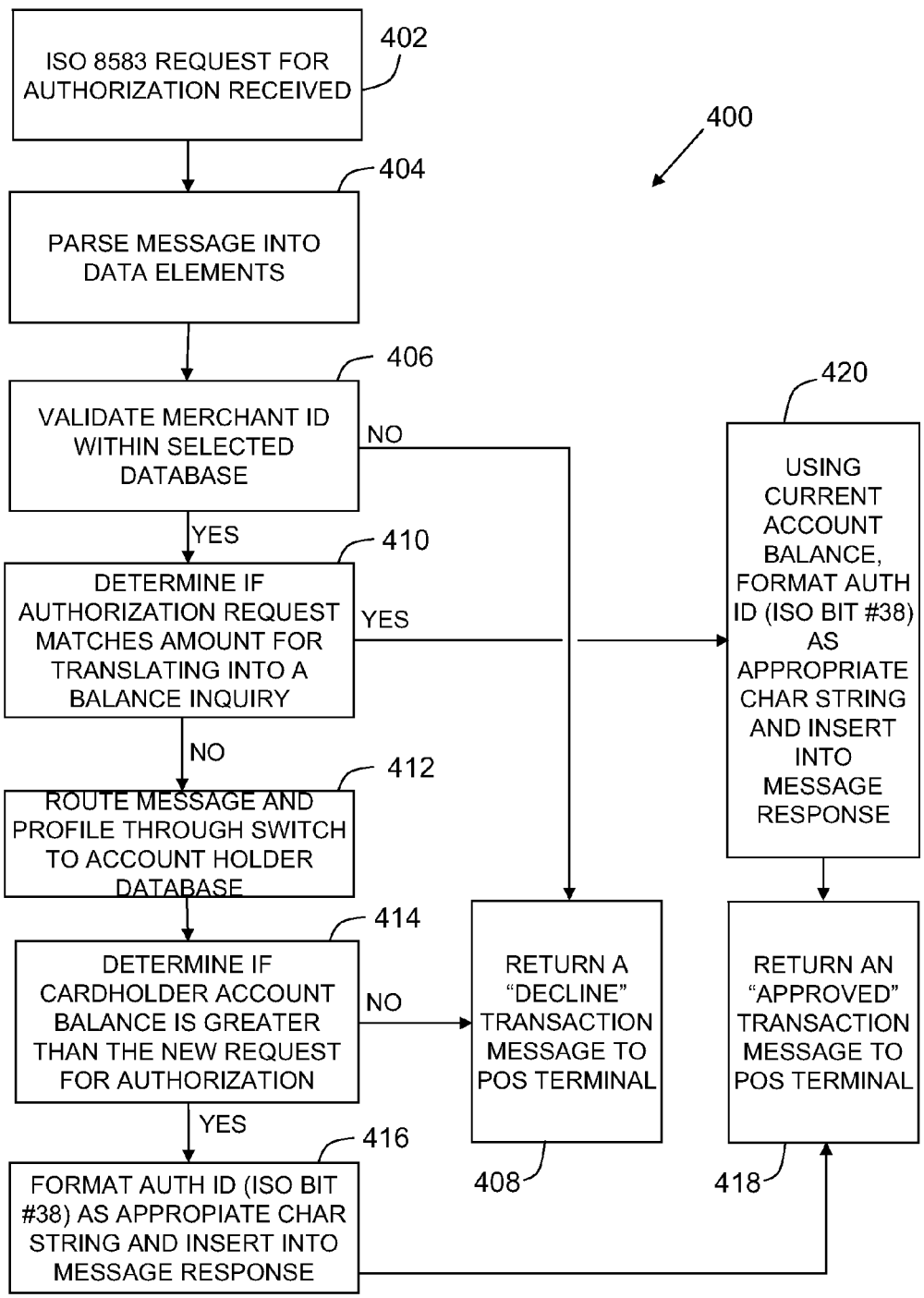
FIG. 12 is a flowchart illustrating a process for translating a penny authorization into a card account balance inquiry message.

FIG. 12 is a flowchart 400 illustrating the process for translating a specific authorization amount into a card account balance inquiry message. An ISO 8583 request for authorization is received 402. The received message is parsed 404 into data elements, and a merchant ID data element is validated 406 as being within a selected database. If the merchant ID is not within the selected database, a decline transaction message is returned 408 to the originating point of sale terminal.

If the merchant ID is within the selected database, it is then determined 410 if the authorization requests matches a specific amount which is then translated into a balance inquiry. If the authorization request does not match the specific amount, the received message is routed 412 through a switch to an account holder database. It is then determined 414 if a cardholder account balance is greater than the requested authorization amount included in the received message. If not, a decline transaction message is returned 408 to the originating point of sale terminal.

If the cardholder account balance is greater than the requested authorization amount, the authorization amount is subtracted from the account balance and an appropriate message response is formatted 416 according to the remaining card balance as described above. An approved transaction message including the appropriate character string within the message response is then returned 418 to the originating point of sale terminal. If the authorization request matches the specific amount, the current account balance is formatted 420 as a character string, as described above, and inserted into the message response and returned 418 to the originating point of sale terminal.

Figure 13:
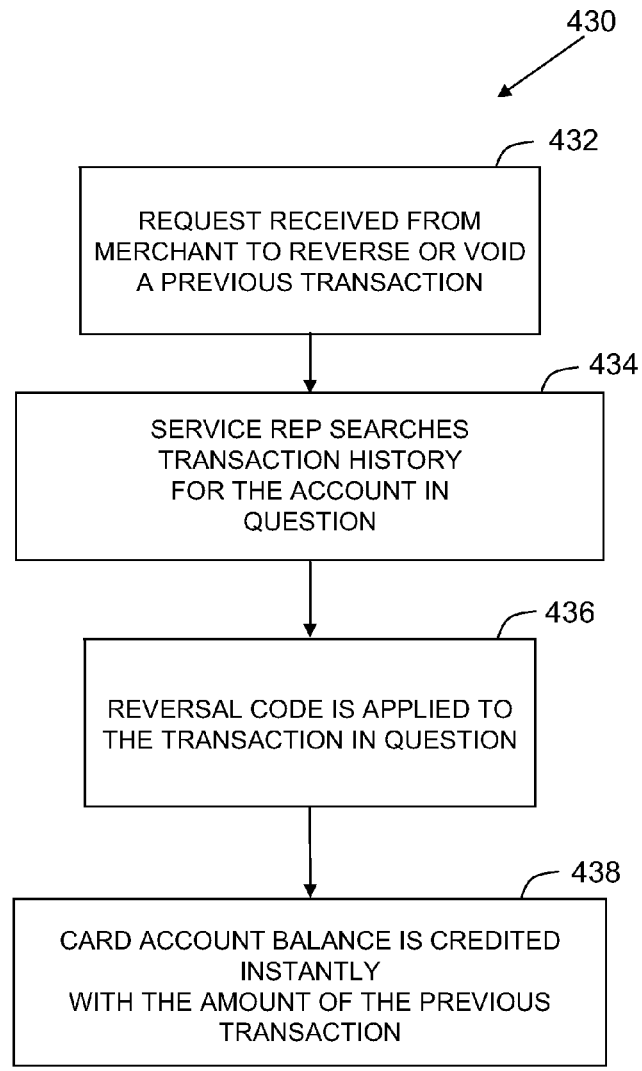
FIG. 13 illustrates a process for instantly reversing a transaction and crediting monetary value onto a stored value card.

FIG. 13 is a flowchart 430 illustrating a process for instantly reversing a transaction and crediting monetary value onto a stored value card. A request is received 432 from a merchant to reverse or void a previous transaction. A service representative then searches 434 a transaction history for the transaction and account in question. Upon finding the transaction and account in question, a reversal code is applied 436 to the transaction in question and the card account balance is credited 438 in the amount of the previous transaction (the transaction in question).

Figure 14:
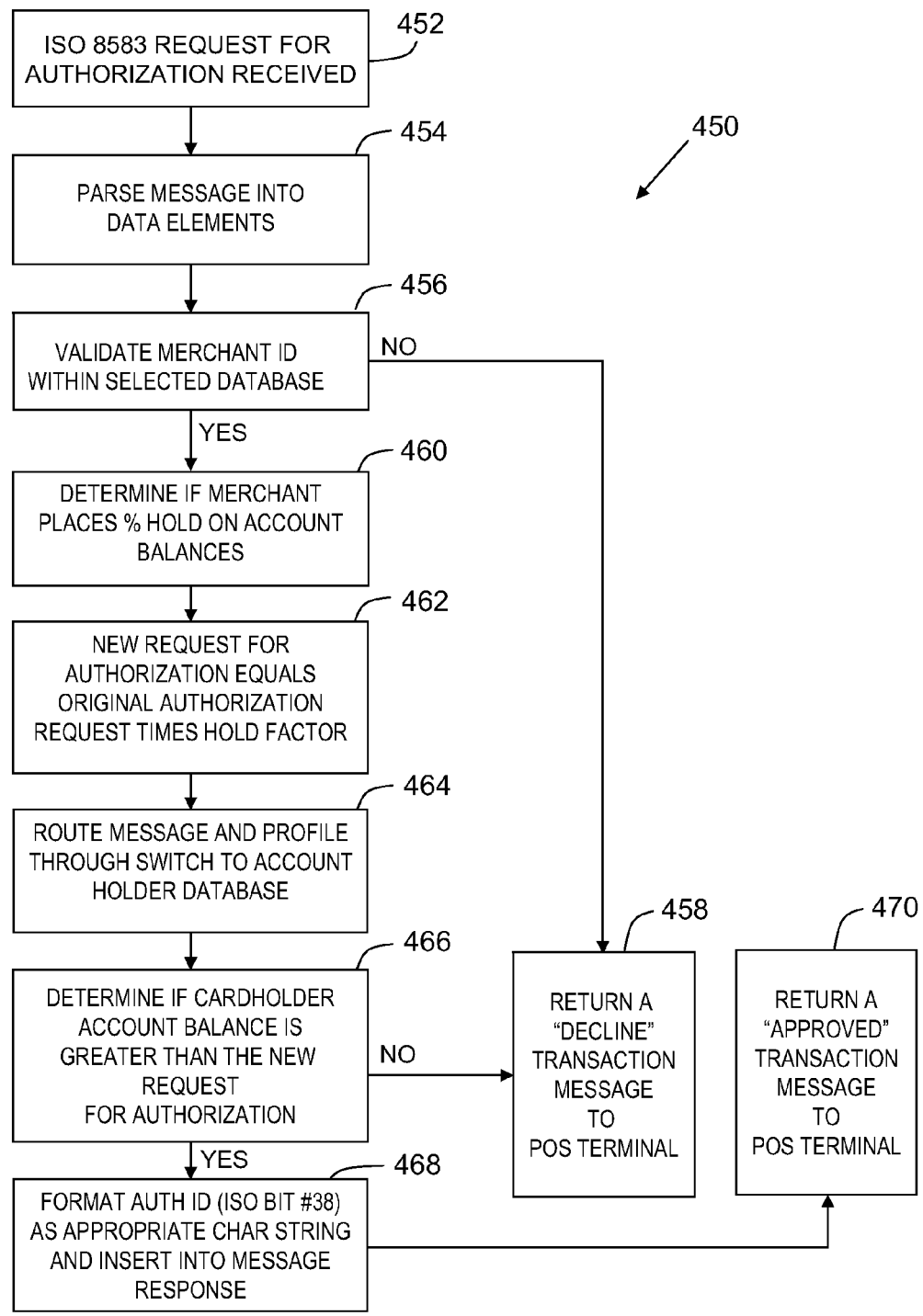
FIG. 14 illustrates a process for the removal of automated holds placed on card balances.

FIG. 14 is a flowchart 450 illustrating a process for the removal of automated holds placed on card balances. An ISO 8583 request for authorization is received 452. The received message is parsed 454 into data elements, and a merchant ID data element is validated 456 as being within a selected database. If the merchant ID is not within the selected database, a decline transaction message is returned 458 to an originating point of sale terminal. If the merchant ID is within the selected database, it is determined 460 if the merchant, identified by the merchant ID, places a percentage hold on account balances. A new request for authorization is generated 462 which equals the original authorization request plus the percentage hold factor.

The new generated authorization request message is routed 464 through a switch to an account holder database. It is then determined 466 if a cardholder account balance is greater than the new authorization amount request that is included in the received message. If not, a decline transaction message is returned 458 to the originating point of sale terminal.

If the cardholder account balance is greater than the requested authorization amount, the revised authorization amount is subtracted from the account balance and included in a character string within the message response that is formatted 468 as described above. An approved transaction message including the appropriate character string showing the revised authorization amount is returned 470 to the originating point of sale terminal within the message response.

Figure 15:
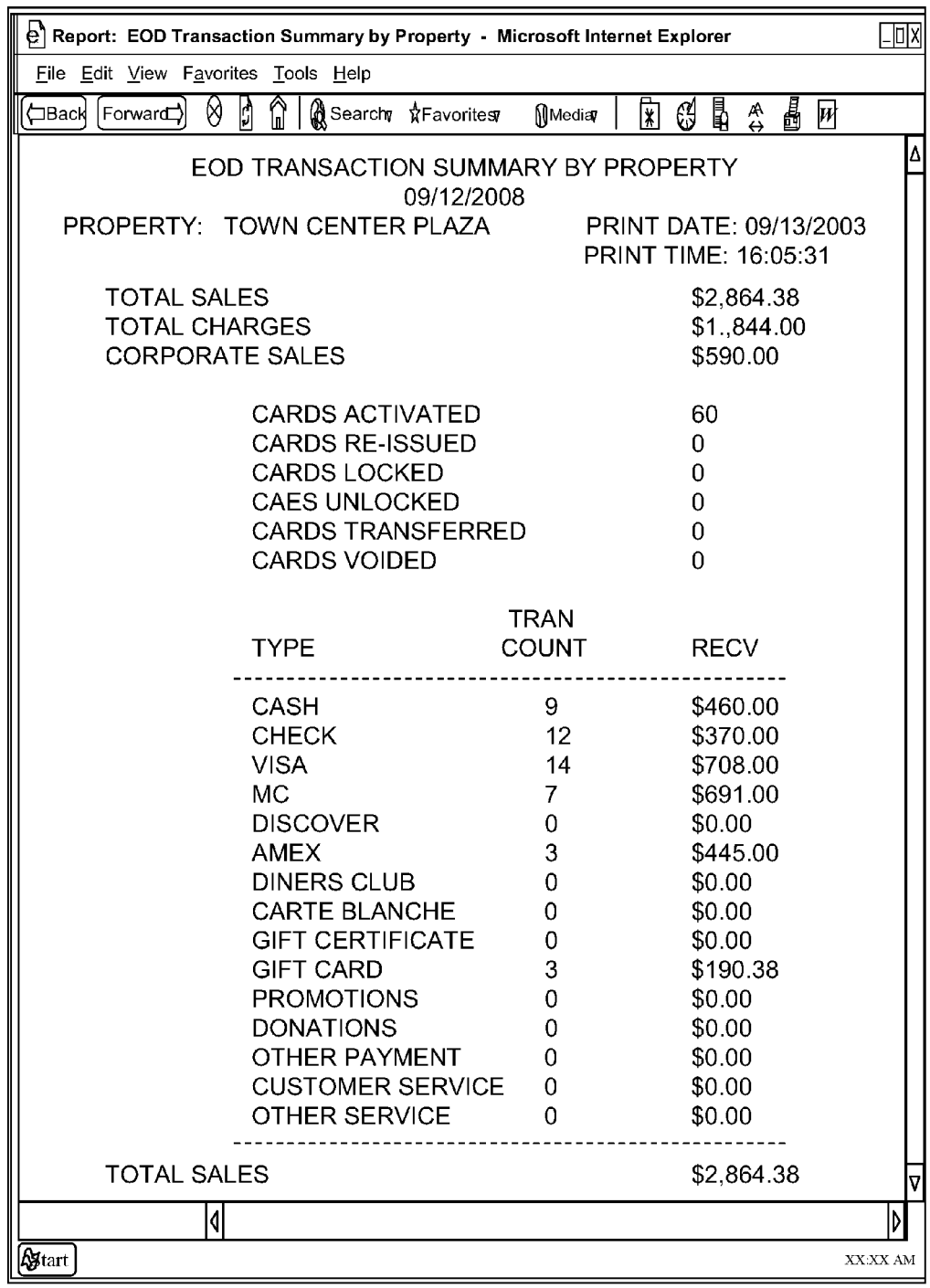
FIG. 15 is a sample report for a shopping center end of day transaction summary by mall property used for balancing.

FIG. 15 is a sample report 500 generated by system 10 for a shopping center end of day transaction summary by property. Report 500 including a tabulation of total sales and a tabulation of the total sales for each payment type. Total sales can then be balanced against the total sales for the various payment types utilized during the day. With respect to the stored value cards, report 500 include a tabulation of the number of stored value cards activated, re-issued, locked, unlocked, transferred and voided.

FIG. 16 is a sample report 510 generated by system 10 for an end of day account transaction by gift card detail by property. Report 510 includes the total sales tabulation and stored value card tabulation described with respect to report 500. In addition, report 510 includes transaction details for each of the gift card transaction that have occurred during the day, including, but not limited to, a reference number, a description, a stored value card number, a card amount, a property fees amount, a transaction amount, a payment type, a date, and a time.

FIG. 17 is a sample report 520 generated by system 10 for the daily redemption of merchant transactions completed at a mall property. Report 520 includes a total redemption amount and a total number of transactions. Report 520 further includes for each transaction, a transaction type, a location (merchant), a transaction amount, a card number and a time.

Figure 18:
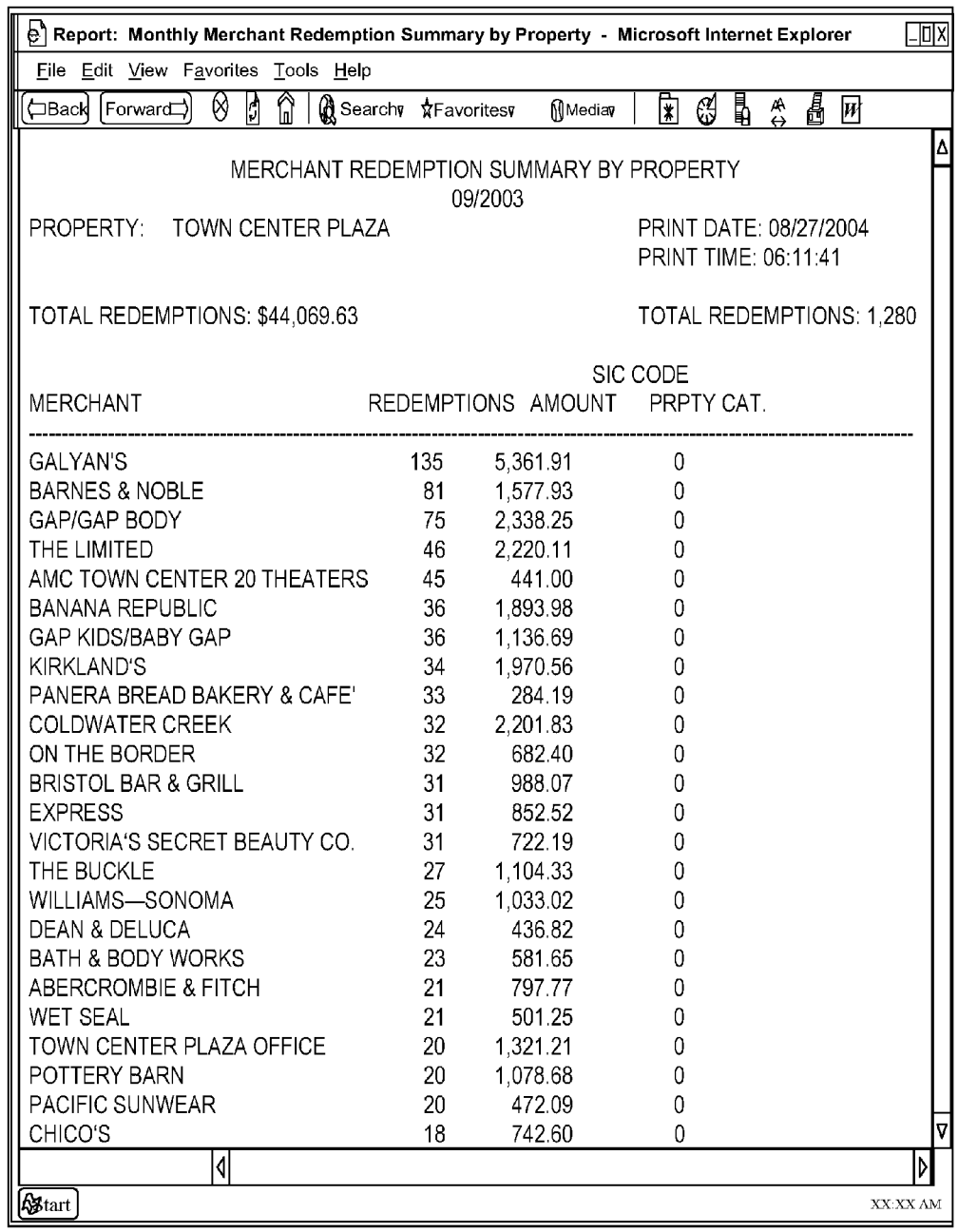
FIG. 18 is a sample report defining a merchant redemption summary for a month by mall property.

FIG. 18 is a sample report 530 generated by system 10 defining a merchant redemption summary for a month by property for stored value cards. Report 530 includes a title of the property (e.g., a name of a mall), a total amount redeemed utilizing the stored value cards, and a total number of redemptions. In addition, report 530 includes a tabulation of redemptions by merchant, the number of redemptions for each listed merchant, and a total amount of redemptions for each listed merchant.

Broadly, system 10, along with the methods for operation described herein, result in a "currency" that can be deployed for malls and other merchant groups both domestic and internationally. As such, an international solution for private-label, stored value gift cards created as a subset of the International bank card networks is provided, delivering a unique "currency" used seamlessly across groupings of merchant tenants and restaurants. Therefore no funds are leaked to merchants who are outside of the gift card program grouping. In other embodiments, instant card credits are provided by adjusting the funds back to the card account balance upon a request that is received from approved merchants.

Some merchant groups, for example, within a mall or plaza, include restaurants. System 10 is further configurable to includes a reversal of automatic holds sent from restaurants primarily where a greater than necessary percentage is taken off the card balance in order to pay for tips. System 10, in one embodiment, is configured to remove this hold, unlike other known cards, so that the entire gift card balance can be used at the restaurants within the merchant group.

System 10 is further configured with gift card accounting tools for administration such as card activation, account updates, and reporting tools offering software features such as account activation, funds transfers, instant account lock and unlock controls, account search and lookup tools, acceptance and reporting of split-tender payments from purchasers. Such accounting tools are thought to simplify end-of-day balancing procedures, and further provide open reporting, in one embodiment, driven via a highly touted, relational database platform using a Microsoft SQL server.

The accounting system enables a new form of currency available for the purchase of goods and services at a single merchant or group of merchants associated with a shopping center or group of shopping centers and malls. The issued currency uses the same monetary system supported by the state in which the shopping center is located. For instance, mall currency issued within the United States are U.S. dollars; issued within provinces of Canada are Canadian dollars; issued within the European Union are euros; issued within the United Kingdom are pounds, and so forth.

The processing logic within the accounting system provides additional features not typically available within the debit and credit card networks including customized authorization numbers, penny authorizations that are translated into balance inquiries, instantaneous transaction reversals and credits applied to stored value cards, and the removal of automated holds placed on card balances typically applied by restaurants for server tips and gas stations for the purchase of fuel.

Through its inherent use of the debit and credit card networks, the system is capable, with no modifications, of being deployed across hundreds of different point of sale systems, cash registers and bank card machines providing a universal solution for participating merchants.

The above described methods and systems build upon existing bank and credit union funds transfer and accounting systems to add new services related to the, processing, accounting and administration of stored value cards, particularly by providing messaging capability to provide account balance data. The described systems accomplish these functionalities by merging features of a proprietary, software switching and mapping system with gateways into the client server applications typical of accounting systems that deliver banking services to consumers. The result is the delivery of an improved stored value card services to consumers, merchants and card issuers. In addition, the above described methods and systems allow and enable banks and credit unions to merge issuance of stored value cards with their existing credit and debit card infrastructures.

The above described systems provide processing methods which further supports multiple electronic funds transfers, internet and telephone access, and banking network access by linking into a core processing center. In one embodiment, the stored value card program utilizes a private-label, bank issued card and national telecommunications networks to simplify integration and operation with existing, merchant point of sales (POS) systems. Retailers accept the gift card like a credit card and consumers can purchase items from the mall merchants up to the amounts credited to the card during activation. Upon using the available funds on the card, consumers can reload their account with additional funds via the customer service center in the mall or the Internet. Consumers purchase their cards from the mall's customer service desk or ATM dispensing machines conveniently located in or near the mall. Shoppers can make inquiries about their card balances via merchant point of sale terminals, toll-free telephone numbers, and Internet websites.

While the invention has been described in terms of various specific embodiments, those skilled in the art will recognize that the invention can be practiced with modification within the spirit and scope of the claims.

What is claimed is:

1. A method for processing stored value card transactions, the stored value cards associated with an account holder database, said method comprising:
   receiving, from a point of sale system, a transaction message requesting an authorization or denial for an individual transaction associated with the account holder database;
   accessing data associated with a particular account within the account holder database based on an account identifier within the transaction message;
   determining if a monetary account balance in the particular account dictates approval or denial of the transaction based upon a transaction type and a transaction amount within the transaction message;
   calculating a remaining monetary account balance in the particular account based upon approval or denial of the transaction;
   creating an authorization response message based on the approval or denial determination, for transmission to the point of sale system, the authorization response message including at least a unique alpha numeric string representing the remaining monetary account balance for the particular account, the unique alphanumeric string within an authorization identification response field of the authorization response message, the content of the alpha numeric string based on data within a separate ISO-8583 data field, and a response code indicative of the approval or denial of the transaction; and
   transmitting the authorization response message to the point of sale system to cause at least one of a display of the unique alpha numeric string at the point of sale system and a printing of the unique alphanumeric string on a receipt generated by the point of sale system as the point of sale system is currently configured.

2. The method according to claim 1 wherein receiving a transaction message comprises receiving a transaction message that is ISO-8583 compatible.

3. The method according to claim 1 wherein the transaction type includes at least one of a deposit, a withdrawal, a transfer, and an account balance inquiry.

4. The method according to claim 1 wherein determining if a monetary account balance in the particular account dictates approval or denial of the transaction comprises:
   treating the transaction type as a split tender transaction when the monetary account balance for the particular account is determined to be less than the transaction amount within the transaction message; and
   selecting a response code indicating an approval of the authorization request for the amount of the monetary account balance.

5. The method according to claim 1 wherein determining if a monetary account balance in the particular account dictates approval or denial of the transaction comprises:
   treating the transaction type as an account balance inquiry when the monetary account balance for the particular account is determined to be less than the transaction amount within the transaction message; and
   selecting a response code indicating a denial of the authorization request.

6. The method according to claim 5 further comprising at least one of causing a reason for denial of the transaction to be displayed by the point of sale system and causing a reason for denial of the transaction to be printed on a receipt by the point of sale system.

7. The method according to claim 1 wherein determining if a monetary account balance in the particular account dictates approval or denial of the transaction comprises treating the transaction type as an account balance inquiry when the transaction amount is equal to a predetermined value.

8. The method according to claim 1 wherein receiving a transaction message comprises receiving the transaction message via a bank card payment network.

9. The method according to claim 1 wherein transmitting the authorization response message to the point of sale system comprises transmitting the authorization response message via a bank card payment network.

10. The method according to claim 1 wherein:
   determining if a monetary account balance in the particular account dictates approval or denial of the transaction comprises treating the transaction type as a balance inquiry when the monetary account balance for the particular account is determined to be less than one dollar and less than the transaction amount, and selecting a response code indicating a denial of the authorization request; and wherein:
   creating an authorization response message comprises creating a unique alphanumeric string representing the monetary account balance of the particular account to include characters indicative of the monetary account balance being in cents inserted into the alphanumeric string following the characters indicative of the monetary account balance.

11. The method according to claim 1 wherein for a transaction amount, when approved, results in a remaining account balance of less than one dollar in the particular account, said method comprises:
   selecting a response code indicating an approval of the authorization request; and wherein: creating an authorization response message comprises creating a unique alphanumeric string representing the monetary account balance of the particular account to include characters indicative of the monetary account balance being in cents inserted into the alphanumeric string following the characters indicative of the monetary account balance.

12. The method according to claim 1 wherein:
   determining if a monetary account balance in the particular account dictates approval or denial of the transaction comprises treating the transaction type as a balance inquiry when the monetary account balance for the particular account is determined to be zero and less than the transaction amount, and selecting a response code indicating a denial of the authorization request; and wherein:
   creating an authorization response message comprises creating a unique alphanumeric string representing the zero account balance of the particular account to include specific characters inserted into the alphanumeric string indicative of the zero account balance.

13. The method according to claim 1 further comprising charging one or more account maintenance fees against the particular account associated with a stored value card.

14. The method according to claim 13 wherein charging one or more account maintenance fees comprises charging one or more account maintenance fees according to state compliance policies relating to the charging of account maintenance fees.

15. The method according to claim 1 wherein accessing data associated with a particular account within the account holder database comprises verifying that a merchant identifier within the transaction message exists within a merchant database associated with the stored value card.

16. The method according to claim 15 further comprising:
declining the individual transaction when the merchant identifier is not included in the merchant database; and
generating a fraudulent transaction report.

17. The method according to claim 1 wherein calculating a remaining monetary account balance in the particular account comprises calculating an automatic hold amount to be added to a transaction amount.

18. The method according to claim 1 wherein, for a transaction amount that is negative, calculating a remaining monetary account balance in the particular account comprises adding the transaction amount to monetary account balance in the particular account.

19. The method according to claim 1 further comprising:
grouping merchants in a merchant database according to one or more of merchant affiliation and shopping center affiliation, each merchant identified by a merchant identifier;
accessing data associated with a particular merchant within the merchant database based on a merchant identifier within the transaction message; and
determining if the affiliations associated with the particular merchant dictate approval or denial of the transaction.

20. The method according to claim 1 further comprising providing reports including one or more of a summary of the daily stored value card transactions, end of day card activation transactions, daily redemptions and transactions completed at individual merchant locations, and a merchant redemption summary by property.

21. The method according to claim 1 further comprising balancing deposits relating to collected stored value card funds against outstanding balances of new and historically funded stored value cards.

22. The method according to claim 1 further comprising ensuring that requests for payments approved and included in authorization response message match the funds requested by debit and credit card processors for payment to merchants.

23. The method according to claim 1 wherein accessing data associated with a particular account within the account holder database comprises routing the transaction message from a gateway through a switch controller to access the account holder database, the routing based on one or more of a bank identification number, an institution identifier, and a branch identifier within the transaction message.

24. A switch controller having computer-executable instructions embodied therein, wherein when executed by said switch controller, the computer-executable instructions cause said switch controller to:
receive, from a gateway into an ISO 8583 electronic funds transfer service, a transaction message originating from a point of sale system, the transaction message requesting an authorization or denial of an individual transaction associated with an account holder database;
parse the transaction message into a series of data elements including at least a transaction amount, a transaction type, a merchant identifier, and an account identifier;
access data relating to an account within the account holder database utilizing the account identifier;
determine if a monetary account balance in the account dictates approval or denial of the transaction based upon the transaction type and the transaction amount within the transaction message;
calculate and store within the database a remaining monetary account balance in the account based upon an approval or a denial of the transaction; and
create an authorization response message based on the calculation, for transmission to the point of sale system via the gateway, the authorization response message including at least a unique alpha numeric string representing the remaining monetary account balance for the account and an approval or denial of the transaction, the unique alphanumeric string within an authorization identification response field of the authorization response message, the content of the alpha numeric string based on data within a separate ISO-8583 data field.

25. The switch controller of claim 24 wherein the transactions are received based on at least one of a bank identification number, an institution identifier, and a branch identifier associated with said switching controller, the at least one of a bank identification number, an institution identifier, and a branch identifier within the transaction message.

* * * * *